United States Patent [19]

Vesenka et al.

[11] Patent Number: 5,591,903

[45] Date of Patent: Jan. 7, 1997

[54] RECONSTRUCTING THE SHAPE OF AN ATOMIC FORCE MICROSCOPE PROBE

[75] Inventors: James P. Vesenka; Richard K. Miller, both of Ames, Iowa

[73] Assignee: Iowa State University Research Foundation, Ames, Iowa

[21] Appl. No.: 289,190

[22] Filed: Aug. 11, 1994

[51] Int. Cl.⁶ ................................................. G01B 5/28
[52] U.S. Cl. .............................................................. 73/105
[58] Field of Search ............................... 73/105; 250/306, 250/307

[56] References Cited

U.S. PATENT DOCUMENTS

| | | | |
|---|---|---|---|
| 4,868,396 | 9/1989 | Lindsay | 250/306 |
| 4,943,719 | 7/1990 | Akamine et al. | 250/306 |
| 5,010,249 | 4/1991 | Nishikawa | 250/306 |
| 5,043,578 | 8/1991 | Güethner et al. | 250/306 |
| 5,066,358 | 11/1991 | Quate et al. | 250/306 |
| 5,144,128 | 9/1992 | Hasegawa et al. | 250/306 |
| 5,150,392 | 9/1992 | Hohn et al. | 250/306 |
| 5,164,595 | 11/1992 | Musselman et al. | 250/306 |
| 5,171,992 | 12/1992 | Clabes et al. | 250/306 |
| 5,193,385 | 3/1993 | Nishioka et al. | 73/105 |
| 5,239,863 | 8/1993 | Koda et al. | 73/105 |
| 5,253,515 | 10/1993 | Toda et al. | 73/105 |

OTHER PUBLICATIONS

Daniel Rugar & Paul Hansma, "Atomic Force Microscopy," Physics Today 23 (Oct. 1990).

David J. Keller & Fransiska S. Franke, "Envelope Reconstruction Of Probe Microscope Images," 294 Surface Science 409–419 (Sep. 10, 1993).

Cornelius Lanszos, "Applied Analysis," pp. 316–331 (1956).

James Vesenka, et al., "Colloidal Gold Atoms as an Incompressible Atomic Force Microscope Imaging Standard For Assessing the Compressibility of Biomolecules," 65 Biophysical J. 992–997 (Sep. 1993).

Y. Li & S. M. Lindsay, "Polystyrene Latex Particles As A Size Calibration For The Atomic Force Microscope," 62 Rev. Sci. Instrum. 2630–2633 (Nov. 1991).

James Vesenka et al., "Three–Dimensional Probe Reconstruction For Atomic Force Microscopy," 65 Rev. Sci. Instrum. 2249–2251 (Jul. 1994).

Peter Markiewicz & M. Cynthia Goh, "Atomic Force Microscopy Probe Tip Visualization and Improvement of Images Using a Simple Deconvolution Procedure," 10 Langmuir 5–7 (Jan. 21, 1994).

*Primary Examiner*—Hezron E. Williams
*Assistant Examiner*—Daniel S. Larkin
*Attorney, Agent, or Firm*—Pravel, Hewitt, Kimball & Krieger

[57] ABSTRACT

A method of reconstructing the shape of an atomic force microscope. The shape of the probe, which is represented by a tip function, is derived from an image taken of a colloidal gold ball by the atomic force microscope. Since the size and shape of the colloidal gold ball is known, the probe shape can readily be determined. After the probe shape has been determined, it is possible to deconvolve or enhance the image of a target sample. This is done by removing the effect of the probe from the target sample image. Further, it is also possible to co-adsorb the colloidal gold balls with the target sample molecules to allow the simultaneous determination of the probe shape and the sample molecule shape.

36 Claims, 8 Drawing Sheets

RECONSTRUCTING THE SHAPE OF AN ATOMIC FORCE MICROSCOPE PROBE

STATEMENT OF RIGHTS

Work for this invention was funded in part by the National Science Foundation under grant number DIR-9113593 and grant number DIR-9004649. The Government may have certain rights in this invention.

BACKGROUND OF THE INVENTION

1. Field of the Invention

The invention relates to probes used in atomic force microscopy, and more particularly, to a technique for reconstructing the tip shape of the atomic force microscope probe.

2. Background of the Related Art

Technological advances in the field of microscopes have been dramatic in recent years. The first major development was the electron microscope, which provided much greater magnification than was possible with optical microscopes. In a scanning electron microscope, a stream of electrons is directed at the sample to be magnified. The high-voltage raster beam of electrons that sweeps across the sample is analogous to the raster beam across a cathode ray tube of a video monitor. In response to the beam of electrons, the sample emits a large number of secondary electrons, which are detected by an electron beam detector. The secondary electron emission from the sample varies according to the topography, composition, crystallinity, and magnetic or electronic effects of the sample. The electron detectors convert the received secondary electrons into digital data for a processor to transform into an image that can be displayed on a video monitor. One limitation of most electron microscopes, however, is that they are unable to image individual surface atoms of a sample. Those electron microscopes that are capable of providing sufficient resolution to image surface atoms are very expensive.

The next major development in the field of microscopes was the scanning tunneling microscope (STM), discovered in the early 1980's, which allowed for the imaging of individual surface atoms. In the STM, a tiny probe is positioned to a few nanometers above the surface of an electrically conducting specimen. The distance between the probe and the specimen must be close enough so that there is an overlap between the electron clouds of the atom at the probe tip and of the nearest atom of the specimen. A voltage applied at the probe causes a small tunneling current to be generated across the gap between the tip of the probe and the specimen. The probe is scanned across the specimen while maintaining a constant gap between the tip and the specimen. The scanning tunneling microscope performs the imaging by detecting the magnitude of the tunnel current developed between the probe and the surface atoms of the specimen. The resulting variations in voltage applied to the probe are translated into an image of the surface topography of the specimen. However, one limitation of the scanning tunneling microscope is that the surface of the sample must be electrically conductive.

To overcome this limitation of the STM, the atomic force microscope (AFM) was developed. For a detailed description of the AFM, refer to Daniel Rugar & Paul Hansma, *Atomic Force Microscopy*, Physics Today 23 (October 1990), which is hereby incorporated by reference. The AFM includes a stylus, or probe, mounted on a cantilever that is contacted to the surface atoms of the sample. The probe is scanned across the surface of the sample to obtain the surface topography at atomic resolutions. As the probe is moved, the cantilever is deflected by interatomic forces asserted by the surface atoms. To ensure that the force asserted by the probe does not alter the location of the sample atoms, the spring constant of the cantilever is much less than the spring constant between two atoms. Originally, spring deflection sensors were utilized by the AFM's to monitor the movement of the cantilever. Recently, however, the detection is performed with laser beams to obtain greater accuracy.

Another configuration used in the atomic force microscope involves positioning the probe at a distance between 10–100 nm from the sample. In this configuration, the interaction between the probe and the surface atoms is caused by longer range forces, such as magnetic, electrostatic and attractive van der Waals forces. The cantilever is driven to vibrate near its resonant frequency. Interactive forces between the tip and the atoms determine the amplitude and phase of the cantilever oscillation. Thus, as the probe is scanned across a sample, the surface contour of the sample can be determined from variations in amplitude and phase of the oscillation.

Various methods have been used to construct the probe of the cantilever. One approach is to construct the probe with fine tungsten wires. The tip is obtained by etching the tungsten wire to a point and then bending the point to perpendicularly extend from the wire. The probe can also be built with a small diamond stylus that is glued on to the cantilever. Yet another method of manufacturing the probes is by using photolithographic techniques to make the tips from silicon, silicon oxide or silicon nitride.

Currently, cantilever probes can consistently be made with a 5 nanometer (nm) radius of curvature. However, even probes of this size have problems imaging samples with rough surfaces, that is, surfaces having height variations greater than a few nanometers. On these surfaces, the lateral resolution of the AFM images is limited by the sharpness of the probe. To resolve this problem, efforts have been made to make sharper probes or by using image reconstruction, where the contribution of the probe to the image is removed. Problems with making probes having lower radii of curvature include the cost and complexity of the manufacturing process. Current reconstruction algorithms assume an ideal probe geometry, which is usually incorrect because probe tips are frequently asymmetrical. In addition, probe tips, especially sharp ones, become contaminated easily, which further distorts the shape of the tips. Other reconstruction algorithms, such as the one described in David J. Keller & Fransiska S. Franke, *Envelope Reconstruction of Probe Microscope Images*, 294 Surface Science 409–419 (1993), based on the geometry of the probe sliding over a photoresist grating with substantially vertical sidewalls, do not provide the resolution required for imaging small molecular structures, such as small biomolecules. Thus, a more accurate reconstruction method is desired.

SUMMARY OF THE PRESENT INVENTION

The method and apparatus of the present invention involves the use of specimens having known shapes and radii to reconstruct the shape of atomic force microscope (AFM) probe. An example of such a known specimen is the colloidal gold ball, which is generally spherical in shape. The cantilever probe is scanned over the colloidal gold ball surface to obtain an AFM image. From the known specimen shape, the actual probe shape can be determined. The probe shape is represented as a tip function and the first and second derivatives of the tip function. Once the probe shape is known, the surface shape of any specimen can be reliably imaged by removing the contributions of the probe. Furthermore, the colloidal gold particles can be co-adsorbed with certain biomolecules, thereby enabling the determination of the probe shape and the neighboring biomolecule shape simultaneously.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
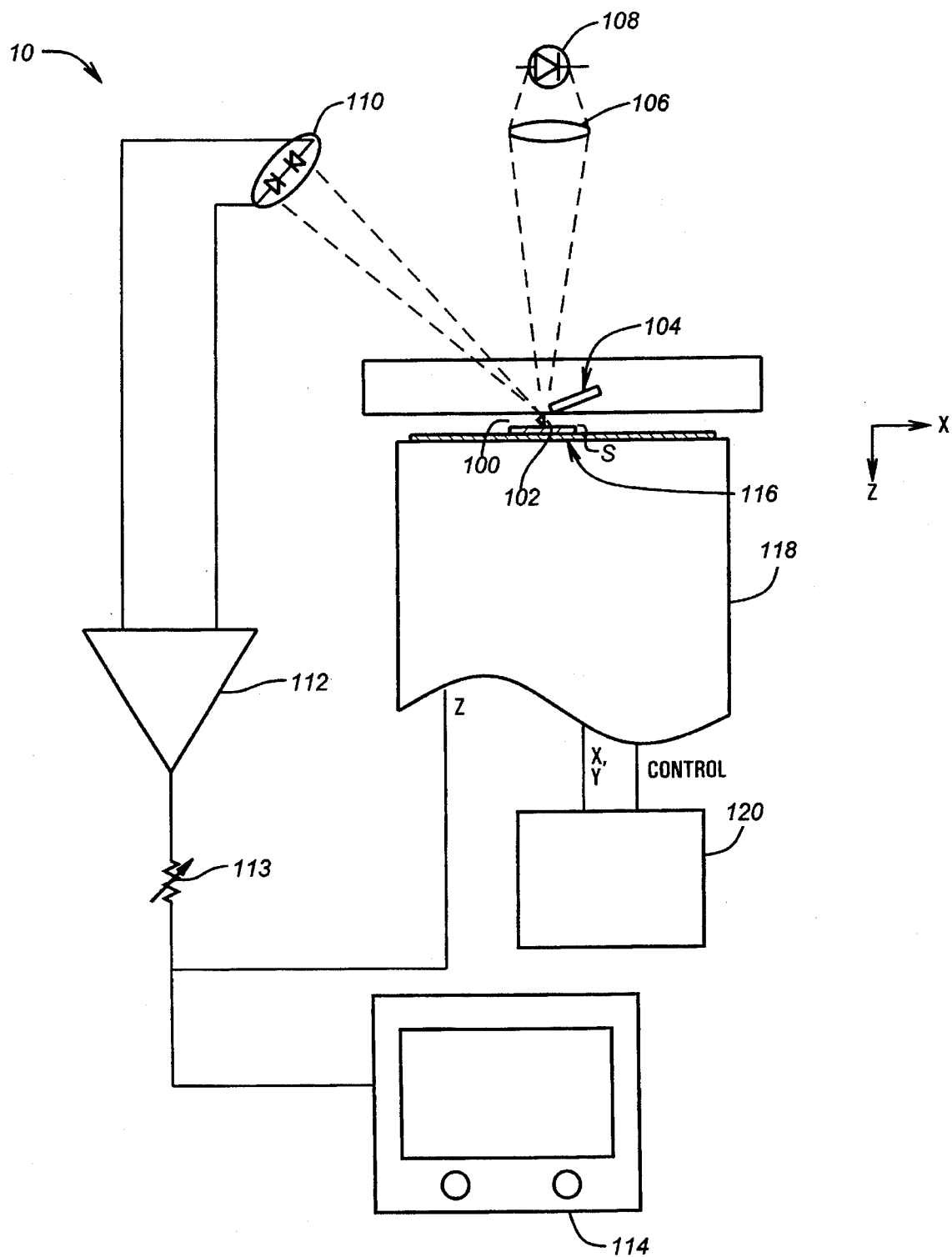
FIG. 1 shows an exemplary atomic force microscope scanning the surface atoms of a sample.

Referring now to FIG. 1, an exemplary atomic force microscope (AFM) 10 is shown monitoring the surface atoms 100 of a sample S. The AFM 10 includes a probe 102 mounted on a cantilever spring 104. The sample S is mounted on a platform 116 that can be moved with respect to the probe 102. The platform 116 is located on and moved by a base 118. To determine the contour defined by the surface atoms 100 of the sample S, the probe 102 is contacted to the surface atoms 100. As the sample S is being moved by the platform 116 over the surface of the sample S, the cantilever 104 is deflected by interatomic forces asserted by the surface atoms 100. The sample S is moved by the platform 116 in the direction of X. When the probe 102 reaches the edge of the sample S, the base 118 drops the platform 116 in the direction of Z to disengage the sample S from the probe 102. Once disengaged, the sample S is returned to its original X position and moved one increment in the direction of Y, which is perpendicular to both X and Z. The platform 116 is then raised to contact the probe 102 to the sample S, which is then scanned again in the X direction. The process is repeated until the entire sample S has been examined. To determine the extent of the deflection of the cantilever 104, a laser beam provided by a laser source 108 is directed at the cantilever 104 through a focusing lens 106. The top surface of the cantilever 104 is made of a mirror like reflecting material. The deflected laser beam is detected by a dual-segment photodetecting diode 110 to allow detection of vertical displacement. The surface area of the dual-segment photodetecting diode 110 is sufficiently large such that the deflections of the laser beam caused by the contour of the surface atoms 100 fall within the surface area. A quadro-segment photodetective diode can also be used, which would allow for the detection of vertical displacement in addition to lateral displacement, that is, frictional forces.

The photodetecting diode 110 produces a pair of signals, which are provided to the inputs of one of a plurality of amplifiers 112. The output of the plurality of amplifiers 112 is a signal representing the Z coordinate value and is provided through a variable resistor 113 to a computer 114, which processes the signals according to an algorithm, described in detail below, to produce an image of the surface atoms of the sample S. The computer 114 also provides control signals to a controller block 120, which translates those signals into X-Y coordinates. The X, Y and Z coordinate signals are then provided to the base 118 to move the sample S to the desired location with respect to the probe 102 and to allow disengagement of the probe 102 and the sample S under predetermined conditions. Other control signals are also provided from the computer 114 via the controller block 120 to allow control functions, such as raising and lowering the base 118.

Certain details of the Atomic Force Microscope 10 described have been omitted for the sake of clarity. Those details are well known to those of ordinary skill in the art. In addition, other types of contact AFMs can be utilized.

Figure 2B:
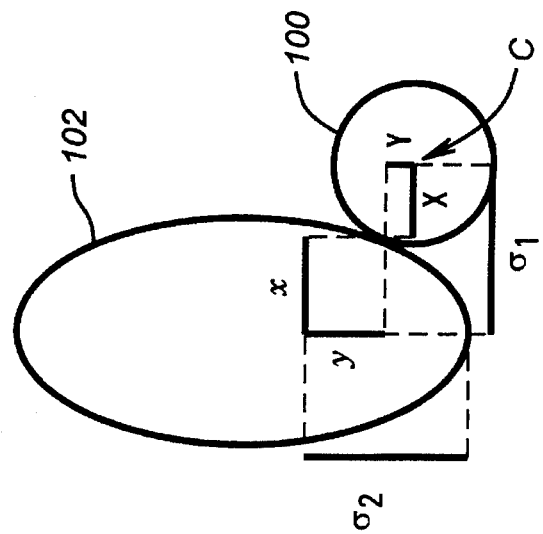
FIGS. 2A and 2B are magnified side and top views, respectively, of a probe contacting a colloidal gold ball.
Figure 2A:
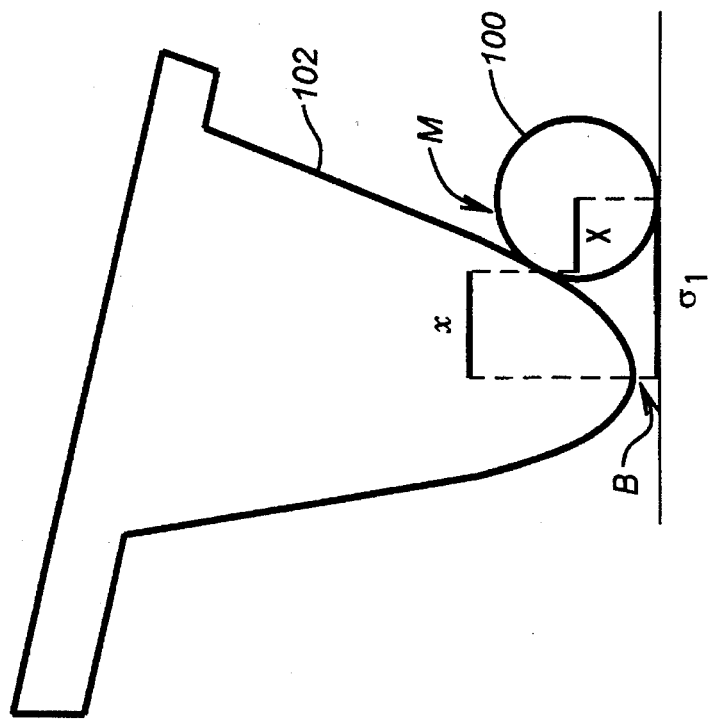

Referring now to FIGS. 2A and 2B, the probe 102 is shown at greater magnification with one of the surface atoms 100, which are preferably colloidal gold balls during the calibration or tip reconstruction phase. A colloidal gold ball comprises a pile of gold atoms. It is contemplated that other materials could also be used, such as plastic particles. Colloidal gold balls are preferably used because most can be manufactured to be spherical in shape. FIG. 2A shows the side view of the probe 102 contacting the gold ball 100. FIG. 2B shows the top view of the probe 102 contacting the colloidal gold ball 100. In FIGS. 2A and 2B, variables X, Y, $\sigma_1$ and $\sigma_2$ are defined with respect to the center of the gold ball 100, as defined by point C. Variables x and y are defined with respect to the minimum point of the probe 102, as defined by point B. The gold ball 100 is defined by an approximately known radius R and is generally spherical in shape. The surface of the gold ball 100 is represented by a sample function $S(X,Y)$. It is noted that the gold ball 100 is chosen such that it is substantially spherical in shape. Those gold balls that are obviously assymmetrical are not used to calibrate the probe 102. The probe 102 is defined by a tip function $T(x,y)$ and is assumed to have a smooth surface. Because of the approximately parabolic and elliptical shape of the probe 102, and because the surface is assumed to be smooth, the probe 102 is always tangentially contacted to the gold ball 100 at exactly one point. The assumption of a smooth surface is superior to the assumption of an ideal probe shape used in the prior art. In actuality, the variations in the surface topology are small enough to usually enable tangential contact. The minimum point B of the probe 102 is located at a position $(\sigma_1, \sigma_2)$ on the sample, and the probe 102 contacts the sample gold ball 100 at a point located at (x,y) in probe coordinates and (X,Y) in sample coordinates. The variables $\sigma_1$ and $\sigma_2$ are referred to as the scan coordinates. When the gold ball 100 is scanned by the probe 102, an image function $I(\sigma_1,\sigma_2)$ is derived. From FIGS. 2A and 2B, it can be seen that $$X=\sigma_1+x; \tag{1}$$

$$Y=\sigma_2+y; \text{ and} \tag{2}$$

$$S(X,Y) = I(\sigma_1, \sigma_2) + T(x,y) \quad (3)$$

From these relationships, as well as the tangential contact, the shape of the probe 102, as represented by the tip function $T(x,y)$, can be determined by imaging the colloidal gold ball 100 with the probe 102. Since the colloidal gold ball 100 has a known spherical shape with a known radius R, the probe shape can be readily reconstructed. When the minimum point B of the probe 102 contacts the maximum point M of the gold ball 100, it is seen that the variables x, y, $\sigma_1$, $\sigma_2$ and $T(x,y)$ are all equal to zero. As will be seen later, this condition is used as the initial condition to solve for the tip function $T(x,y)$ of the probe 102.

Thus, to reconstruct the shape or tip function $T(x,y)$ of the probe 102, one colloidal gold ball 100 is scanned by the probe 102 in the atomic force microscope 10. The digitally imaged data of the colloidal gold ball 100 are stored by the computer 114 in an array D having dimensions IC by IC. Each pixel in the imaged data array D represents a certain area of the actual gold ball image.

Figure 3A:
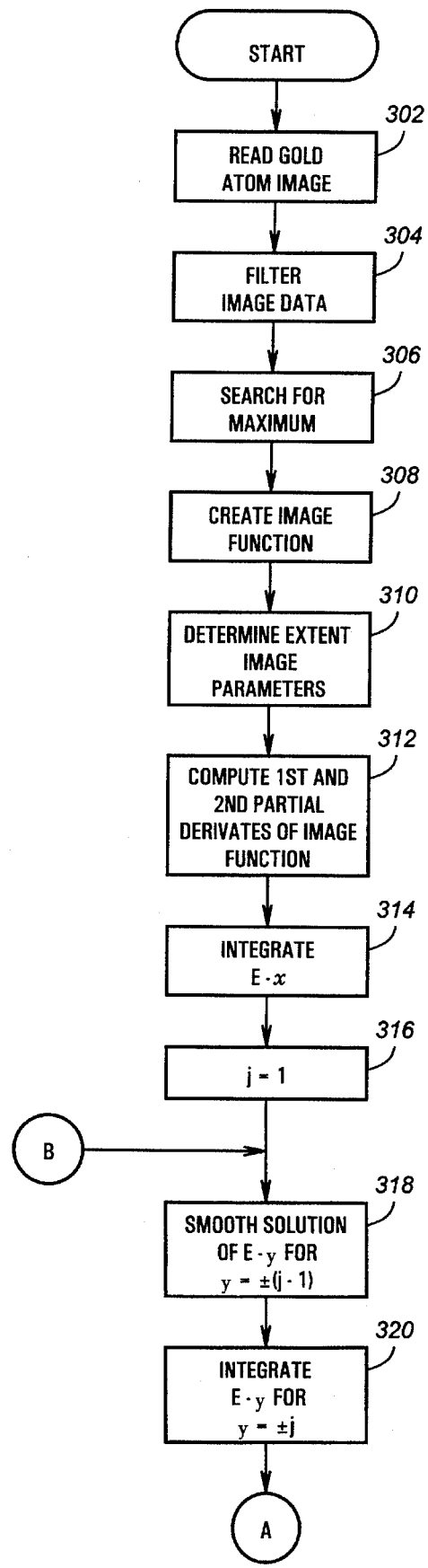
FIGS. 3A and 3B are a flow diagram showing the process of reconstructing the tip shape of the probe of FIGS. 2A and 2B.
Figure 3B:
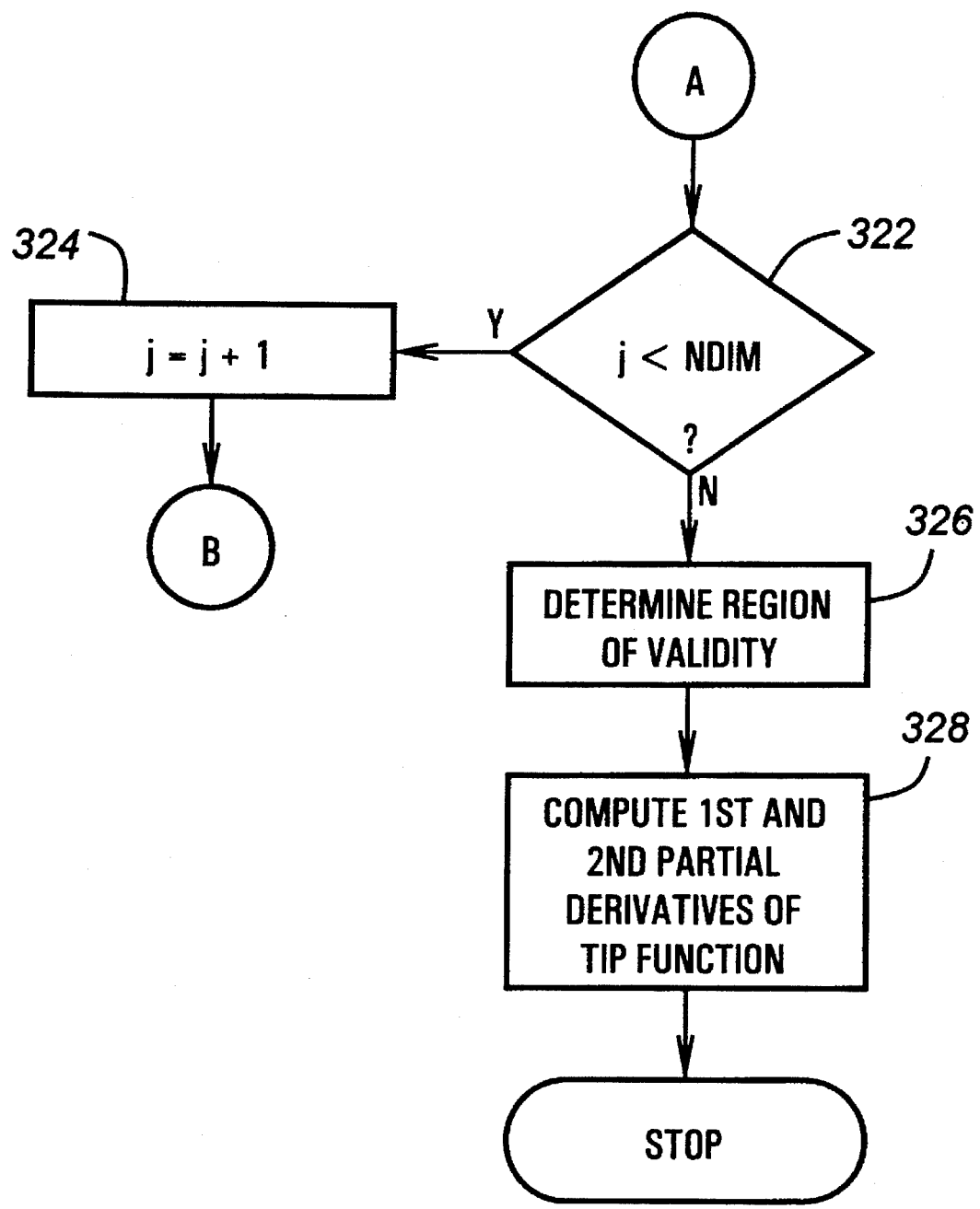

Referring now to FIGS. 3A and 3B, a flow diagram is shown of the process of reconstructing the shape of the probe 102. In step 302, the imaged data array D for the gold ball 100, the radius R of the gold ball 100 and the distance H in nanometers represented by each data pixel are retrieved. From the approximately known radius of the gold ball 100, the exact value of the radius R is measured from the imaged data using standard software, which is part of the AFM 10, as is known to those skilled in the art. As noted above, the data array D has dimensions IC by IC. In the preferred embodiment, the value of IC is set as one of values 128, 256 or 512. Proceeding next to step 304, a filtering operation is performed on the imaged data array D. The imaged data provided by the atomic force microscope 10 contains noisy measurement errors. To smooth out the noise, an averaging function according to Equation 4 is performed on the imaged data array D and the results are placed into an array A, also having dimensions IC by IC.

$$\begin{aligned} A(i,j) = &\ [D(i-1,j-1) + D(i-1,j) + D(i-1,j+1) + \\ &\ D(i,j-1) + 4*D(i,j) + D(i,j+1) + \\ &\ D(i+1,j-1) + D(i+1,j) + D(i+1,j+1)]/12 \end{aligned} \quad (4)$$

where $1 \leq i,j \leq IC$ for the imaged data array $D(i,j)$ and $2 \leq i, j \leq IC-1$ for the averaged or smoothed data array $A(i,j)$. Since the averaging algorithm cannot be applied at the edge regions, that is, where i,j=1 or i,j=IC, the values of $A(i,j)$ at those points are set equal to the values of $D(i,j)$.

Proceeding next to step 306, a search is performed for the maximum data value contained in the averaged data array $A(i,j)$. The maximum data value is represented by DMAX, which is the maximum value of $A(i,j)$, with IMAX and JMAX the i and j values of the maximum $A(i,j)$ value. Proceeding next to step 308, the image function $I(m,n)$ is defined in a data window of size JK by JK, and it is centered at location (IMAX,JMAX) in the data array $A(i,j)$. The variable JK is preferably set to the value 149 if IC is greater than 256 and is set to 99 otherwise. The image function $I(m,n)$ is scaled according to Equation 5 inside the data window.

$$I(m,n) = \frac{A(m+IMAX, n+JMAX) * 2 * R}{DMAX} \quad (5)$$

where $-(JK-1)/2 \leq m,n \leq (JK-1)/2$ and R is the radius of the gold ball 100. The variables m,n are scaled with respect to the variables $\sigma_1, \sigma_2$, with the scale factor defined by the distance H in nanometers represented by each pixel.

Figure 4:
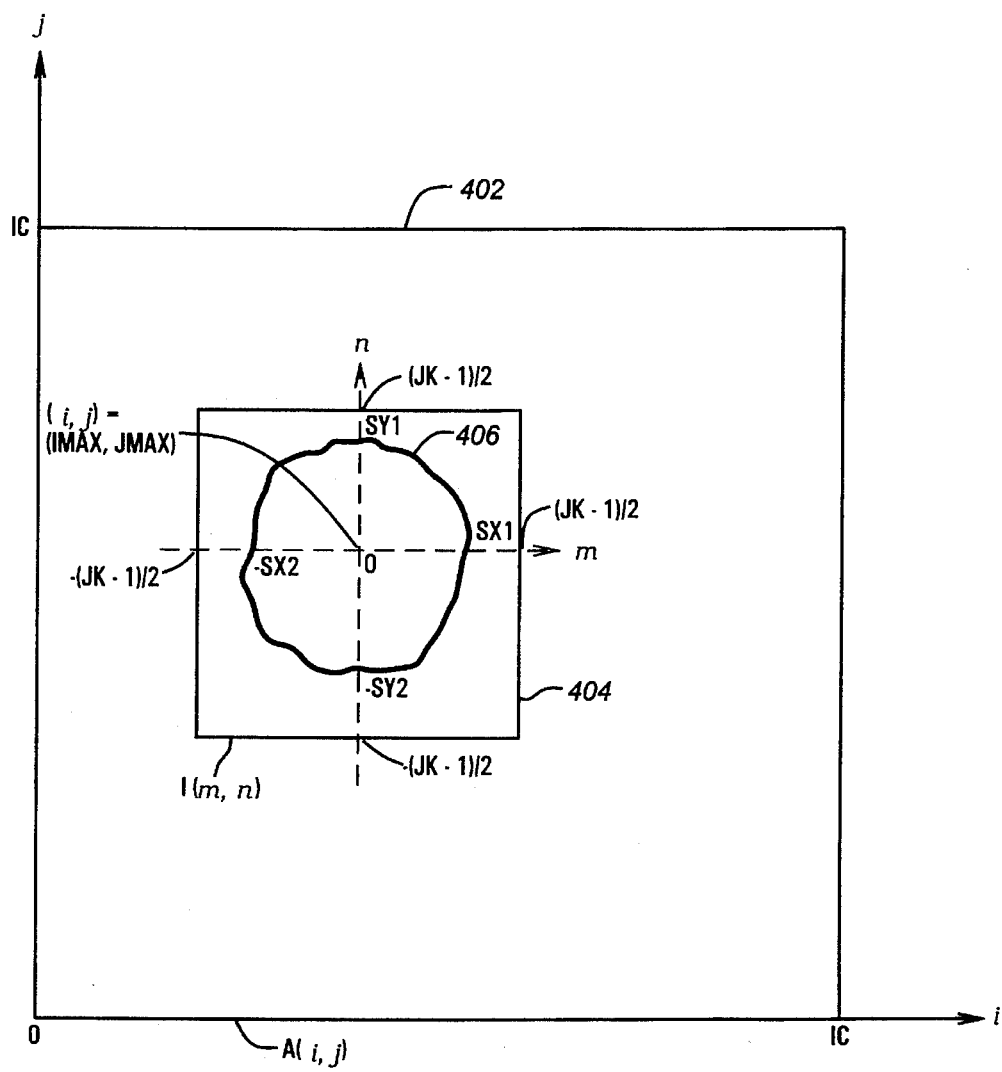
FIG. 4 illustrates various image arrays of the colloidal gold ball of FIGS. 2A and 2B.

A better understanding of the arrays $A(i,j)$ and $I(m,n)$ can be achieved by referring to FIG. 4. In FIG. 4, the averaged data array $A(i,j)$ of size IC by IC is represented by an outer boundary 402, and the image function $I(m,n)$ is represented by a boundary 404. As noted above, the maximum data value DMAX is located at location (IMAX,JMAX) on the i-j axis, which is defined as the center (0,0) of the image function $I(m,n)$ for $-(JK-1)/2 \leq m,n \leq (JK-1)/2$.

Proceeding next to step 310, the points at which the image function $I(m,n)$ intersect the m and n axes are determined. The colloidal gold ball 100 is generally represented by a boundary 406. The intersection points are represented by parameters SX1, SY1, SX2, and SY2, also referred to as "extent of image" parameters. The image function $I(m,n)$ crosses the m-axis at locations $-SX2$ and SX1, and it crosses the n-axis at locations $-SY2$ and SY1. The extent of image parameters SX1 and SX2 are determined by performing a backward difference of the averaged data $$Q(i,j) = \frac{[A(i+IMAX, JMAX) - A(i+IMAX-1, JMAX)] * 2 * R}{DMAX} \quad (6)$$

array A (i, j) according to the following equation:

for $-(JK-1)/2 \leq i \leq (JK-1)/2$ and j=JMAX.

Figure 5:
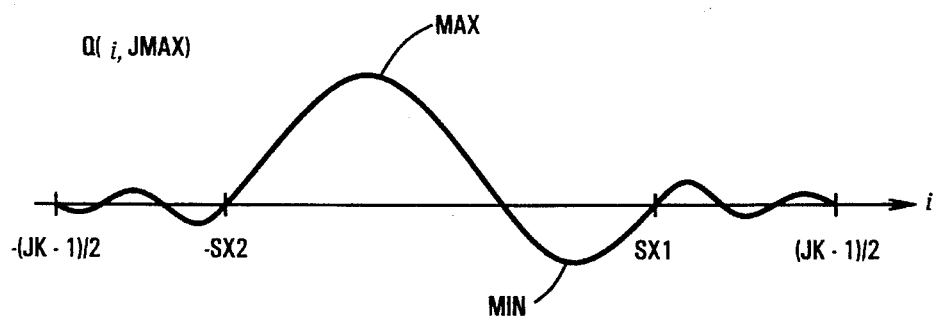
FIG. 5 is the curve of a backward difference of an image array to determine the extent of the image parameters.

The function $Q(i,JMAX)$ is shown in FIG. 5. Referring to FIG. 5, it can be seen that the function $Q(i,JMAX)$ crosses the i-axis at various points, and that it has a maximum point MAX and a minimum point MIN. The value of SX1 is found by determining the first crossing point of the function $Q(i,JMAX)$ with the i-axis that is to the right of the minimum point MIN. The value of SX2 is found by determining the first crossing point of the function $Q(i,JMAX)$ with the i-axis that is to the left of the maximum point MAX.

Similarly, the extent of image parameters SY1 and SY2 are determined by performing a backward difference of the averaged data array $A(i,j)$ according to the following equation:

$$Q(i,j) = \frac{[A(IMAX, j+JMAX) - A(IMAX, j+JMAX-1)] * 2 * R}{DMAX} \quad (7)$$

for i=IMAX and $-(JK-1)/2 \leq j \leq (JK-1)/2$. The curve for $Q(IMAX,j)$ is similar in shape to the curve for $Q(i,JMAX)$ shown in FIG. 5, with the i and j axes interchanged. The extent of image parameters SY1 and SY2 are found in the same way as parameters SX1 and SX2.

Having determined the image function $I(m,n)$, it is desired that the unknown variables $T(x,y)$, $\sigma_1(x,y)$ and $\sigma_2(x,y)$, all of which are dependent upon variables x and y as defined in FIGS. 2A and 2B, be determined. Since the probe 102 and the gold ball 100 must make tangential contact, the following equations are true:

$$\frac{\delta T}{\delta x}(X,Y) = \frac{\delta S}{\delta X}(\sigma_1 + x, \sigma_2 + y) \quad (8)$$

$$\frac{\delta T}{\delta y}(X,Y) = \frac{\delta S}{\delta Y}(\sigma_1 + x, \sigma_2 + y) \quad (9)$$

$$\frac{\delta I}{\delta \sigma_1} = \frac{\delta S}{\delta X} \quad (10)$$

$$\frac{\delta I}{\delta \sigma_2} = \frac{\delta S}{\delta Y} \quad (11)$$

From these relationships, the partial differential equations E-x and E-y shown in Equations 12 and 13 are derived. The right hand sides of the partial differential equations E-x and E-y are expressed in terms of second derivatives of the known image function $I(\sigma_1, \sigma_2)$. The derivatives of the image function $I(\sigma_1, \sigma_2)$ are calculated in step 312. Thus, Equations 12 and 13 represent the relationships of the tip function T and scan coordinates $\sigma_1$ and $\sigma_2$ to the image of the colloidal gold ball scanned by the probe 102.

By solving the partial differential equations E-x and E-y, the variables $\sigma_1$, $\sigma_2$ and T are determined. The differential equation E-x represents the partial derivative of the variables $\sigma_1$, $\sigma_2$ and T with respect to x, and E-y represents the partial derivative of the variables $\sigma_1$, $\sigma_2$ and T with respect to y.

$$(E-x) \begin{cases} \dfrac{\delta T}{\delta x} = -\dfrac{X}{\alpha}, \\ \dfrac{\delta \sigma_1}{\delta x} = \left[ \left( \dfrac{\delta^2 I(\sigma_1,\sigma_2)}{\delta \sigma_2^2} - \dfrac{X^2-R^2}{\alpha^3} \right) \dfrac{(Y^2-R^2)}{\alpha^3} - \left( \dfrac{\delta^2 I(\sigma_1,\sigma_2)}{\delta \sigma_1 \delta \sigma_2} + \dfrac{XY}{\alpha^3} \right) \left( \dfrac{-XY}{\alpha^3} \right) \right] / D, \\ \dfrac{\delta \sigma_2}{\delta x} = \left[ -\left( \dfrac{\delta^2 I(\sigma_1,\sigma_2)}{\delta \sigma_1 \delta \sigma_2} + \dfrac{XY}{\alpha^3} \right) \left( \dfrac{Y^2-R^2}{\alpha^3} \right) + \left( \dfrac{\delta^2 I(\sigma_1,\sigma_2)}{\delta \sigma_1^2} - \dfrac{Y^2-R^2}{\alpha^3} \right) \left( \dfrac{-XY}{\alpha^3} \right) \right] / D, \end{cases} \quad (12)$$

where $X = \sigma_1 + x$, $Y = \sigma_2 + y$, $\alpha = \sqrt{R^2 - X^2 - Y^2}$, and $$D = \left( \dfrac{\delta^2 I(\sigma_1,\sigma_2)}{\delta \sigma_1^2} - \dfrac{Y^2-R^2}{\alpha^3} \right) \left( \dfrac{\delta^2 I(\sigma_1,\sigma_2)}{\delta \sigma_2^2} - \dfrac{X^2-R^2}{\alpha^3} \right) - \left( \dfrac{\delta^2 I(\sigma_1,\sigma_2)}{\delta \sigma_1 \delta \sigma_2} + \dfrac{XY}{\alpha^3} \right)^2$$

$$(E-y) \begin{cases} \dfrac{\delta T}{\delta y} = -\dfrac{Y}{\alpha}, \\ \dfrac{\delta \sigma_1}{\delta y} = \left[ \left( \dfrac{\delta^2 I(\sigma_1,\sigma_2)}{\delta \sigma_2^2} - \dfrac{X^2-R^2}{\alpha^3} \right) \dfrac{(-XY)}{\alpha^3} - \left( \dfrac{\delta^2 I(\sigma_1,\sigma_2)}{\delta \sigma_1 \delta \sigma_2} + \dfrac{XY}{\alpha^3} \right) \left( \dfrac{X^2-R^2}{\alpha^3} \right) \right] / D, \\ \dfrac{\delta \sigma_2}{\delta y} = \left[ -\left( \dfrac{\delta^2 I(\sigma_1,\sigma_2)}{\delta \sigma_1 \delta \sigma_2} + \dfrac{XY}{\alpha^3} \right) \left( \dfrac{-XY}{\alpha^3} \right) + \left( \dfrac{\delta^2 I(\sigma_1,\sigma_2)}{\delta \sigma_1^2} - \dfrac{Y^2-R^2}{\alpha^3} \right) \left( \dfrac{X^2-R^2}{\alpha^3} \right) \right] / D, \end{cases} \quad (13)$$

where X, Y, $\alpha$, and D are the same as above.

In Equations 12 and 13, the second partial derivatives of the image function $I(\sigma_1,\sigma_2)$ with respect to $\sigma_1$ and $\sigma_2$ are estimated in step 312 according to Equations 14–17. The method of estimating partial derivatives of a function are standard numerical analysis techniques well known to those skilled in the art. In the preferred embodiment, H is set to the value 1 nm/pixel, that is, the distance represented by each pixel is 1 nm. In this case, the variables $\sigma_1$ and $\sigma_2$ are identical to the variables m and n, respectively. As a result, the partial derivatives of the image function $I(\sigma_1,\sigma_2)$ can be expressed directly in terms of $\sigma_1$ and $\sigma_2$ rather than in terms of m and n. Thus, the second partial derivative of the image function $I(\sigma_1,\sigma_2)$ with respect to the variable $\sigma_1$ is estimated in Equation 14.

$$\dfrac{\delta^2 I(\sigma_1,\sigma_2)}{\delta \sigma_1^2} \equiv \quad (14)$$

$$I_{11}(\sigma_1,\sigma_2) = [4 * I(\sigma_1-4,\sigma_2) + 4 * I(\sigma_1-3,\sigma_2) + I(\sigma_1-2,\sigma_2) - 4 * I(\sigma_1-1,\sigma_2) - 10 * I(\sigma_1,\sigma_2) - 4 * I(\sigma_1+1,\sigma_2) + I(\sigma_1+2,\sigma_2) + 4 * I(\sigma_1+3,\sigma_2) + 4 * I(\sigma_1+4,\sigma_2)]/100\,H^2,$$

where H is the distance in nanometers represented by each pixel in the imaged data array A (i,j), and $-(JK-1)/2+4 \leq \sigma_1, \sigma_2 \leq (JK-1)/2-4$. The partial derivative is preferably estimated as zero at the edges of the image function $I(\sigma_1,\sigma_2)$, that is, where $\sigma_1 = -(JK-1)/2, \ldots, -(JK-1)/2+3$ or $\sigma_1 = (JK-1)/2-3, \ldots, (JK-1)/2$.

The second partial derivative of $I(\sigma_1,\sigma_2)$ with respect to the variable $\sigma_2$ is determined in Equation 15.

$$\dfrac{\delta^2 I(\sigma_1,\sigma_2)}{\delta \sigma_2^2} \equiv \quad (15)$$

$$I_{22}(\sigma_1,\sigma_2) = [4 * I(\sigma_1,\sigma_2-4) + 4 * I(\sigma_1,\sigma_2-3) + I(\sigma_1,\sigma_2-2) - 4 * I(\sigma_1,\sigma_2-1) - 10 * I(\sigma_1,\sigma_2) - 4 * I(\sigma_1,\sigma_2+1) + I(\sigma_1,\sigma_2+2) + 4 * I(\sigma_1,\sigma_2+3) + 4 * I(\sigma_1,\sigma_2+4)]/100\,H^2,$$

for $-(JK-1)/2+4 \leq \sigma_1, \sigma_2 \leq (JK-1)/2-4$. The second partial derivative $I_{22}(\sigma_1,\sigma_2)$ is assumed to be zero at the same points as the second partial derivative $I_{11}(\sigma_1,\sigma_2)$.

To calculate the mixed second partial derivative of $I(\sigma_1,\sigma_2)$ with respect to both $\sigma_1$ and $\sigma_2$, the first partial derivative of $I(\sigma_1,\sigma_2)$ with respect to $\sigma_1$ must first be determined in Equation 16.

$$\dfrac{\delta I(\sigma_1,\sigma_2)}{\delta \sigma_1} \equiv \quad (16)$$

$$I_1(\sigma_1,\sigma_2) = [-4 * I(\sigma_1-2,\sigma_2) - 2 * I(\sigma_1-1,\sigma_2) + 2 * I(\sigma_1+1,\sigma_2) + 4 * I(\sigma_1+2,\sigma_2)]/20\,H$$

where $-(JK-1)+2 \leq \sigma_1, \sigma_2 \leq (JK-1)2-2$. From the first partial derivative, the mixed second derivative with respect to $\sigma_1$ and $\sigma_2$ can be determined in Equation 17.

$$\dfrac{\delta^2 I(\sigma_1,\sigma_2)}{\delta \sigma_1 \delta \sigma_2} \equiv \quad (17)$$

$$I_{12}(\sigma_1,\sigma_2) = [-4 * I_1(\sigma_1,\sigma_2-2) - 2 * I_1(\sigma_1,\sigma_2-1) + 2 * I_1(\sigma_1,\sigma_2+1) + 4 * I_1(\sigma_1,\sigma_2+2)]/20\,H$$

where $-(JK-1)/2+4 \leq \sigma_1, \sigma_2 \leq (JK-1)/2-4$.

Proceeding next to step 314, the partial differential equations E-x are solved using an integration technique known to those skilled in the art as the fourth order Runge-Kutta algorithm. It is contemplated that various other integration techniques can be used besides the Runge-Kutta algorithm. The partial differential equations E-x are preferably solved along the line y=0 for $-NDIM+1 \leq x \leq NDIM-1$, where the value of NDIM is preferably set at 41. A brief description of the fourth order Runge-Kutta algorithm to solve the partial differential equations E-x is provided below.

For better clarity in the ensuing discussion, the unknown variables T, $\sigma_1$, and $\sigma_2$ are represented as a vector v:

$$v = \begin{pmatrix} T \\ \sigma_1 \\ \sigma_2 \end{pmatrix} \quad (18)$$

The partial differential equations E-x are represented also in vector form as $$\frac{\delta v}{\delta x} \equiv f(x,y,v) = \begin{pmatrix} \frac{\delta T}{\delta x} \\ \frac{\delta \sigma_1}{\delta x} \\ \frac{\delta \sigma_2}{\delta x} \end{pmatrix} \quad (19)$$

The Runge-Kutta algorithm solves the partial differential equations E-x in incremental steps of h, which preferably is set at the value 0.25 when integrating forward and −0.25 when integrating backward. The initial condition used to solve the partial differential equations E-x is to set the tip function T(x,y)=0 when $\sigma_1=\sigma_2=0$. Thus, assuming that the solution at $x=x_k$ is known, as expressed in Equation 20, $$v(x_k)=a, \quad (20)$$

then the Equations 21–25 are solved to find the solution for the partial differential equations E-x at $x_k+h$.

$$f1 = f(x_k,y,a), \quad (21)$$

$$f2 = f\left(x_k + \frac{h}{2}, y, a + \frac{h}{2} f1\right), \quad (22)$$

$$f3 = f\left(x_k + \frac{h}{2}, y, a + \frac{h}{2} f2\right), \quad (23)$$

$$f4 = f(x_k + h, y, a + hf3), \text{ and} \quad (24)$$

$$v(x_k + h) = \frac{h}{6}[f1 + 2f2 + 2f3 + f4]. \quad (25)$$

Equations 21–25 make up the fourth order Runge-Kutta algorithm for solving differential equations. The vector f1 is equated to the values of the right hand side (RHS) of the differential equations E-x at the location $x_k$ for the initial condition a. The vector f2 is equated to the values of the RHS of E-x at the location $x_k+h/2$ for the initial condition a+(h/2)f1. The vector f3 is determined also at location $x_k+h/2$, but for the initial condition a+(h/2)f2. The vector f4 is equated to the RHS of E-x at location $x_k+h$ for the initial condition a+hf3. Finally, in Equation 25, the vector $v(x_k+h)$ is set equal to the weighted sum of the vectors f1, f2, f3, and f4 found above.

Equations 21–25 are performed for y=0 and $-40 \leq x \leq 40$ in the preferred embodiment. As can be seen from Equations 21–25, the second derivatives $I_{11}(\sigma_1,\sigma_2)$, $I_{12}(\sigma_1,\sigma_2)$ and $I_{22}(\sigma_1,\sigma_2)$ of the image function $I(\sigma_1,\sigma_2)$ are needed at arbitrary points that do not necessarily correspond to pixel points, that is, $\sigma_1$ and $\sigma_2$ are not integer values. To determine the values of the derivatives at these points, an interpolation algorithm is performed. For example, to find the value of the second derivative $I_{11}(\sigma_1,\sigma_2)$ at an arbitrary point $(\sigma_1,\sigma_2)$, Equations 26–32 are performed.

$$xx = \frac{\sigma_1}{H}, \quad (26)$$

$$yy = \frac{\sigma_2}{H}, \quad (27)$$

$$k1 = int(xx), \quad (28)$$

$$k2 = int(yy), \quad (29)$$

$$t1 = xx - k1, \quad (30)$$

$$t2 = yy - k2, \text{ and} \quad (31)$$

$$\begin{aligned} I_{11}(\sigma_1,\sigma_2) = &\ I_{11}(k1,k2) * (1-t1) * (1-t2) + \\ &\ I_{11}(k1,k2+1) * (1-t1) * t2 + \\ &\ I_{11}(k1+1,k2) * t1 * (1-t2) + \\ &\ I_{11}(k1+1,k2+1) * t1 * t2, \end{aligned} \quad (32)$$

where int denotes the integer part of a number and H represents the distance in nanometers between pixels. The values of $\sigma_1$ and $\sigma_2$ are divided by the distance H to obtain variables xx and yy, respectively. Next, the integer portions of xx and yy are placed into variables k1 and k2, respectively. The variables k1 and k2 are then subtracted form the variables xx and yy, respectively, to obtain the fractional portions of variables xx and yy. These fractional portions are stored into variables t1 and t2. Using the integer values in variables k1 and k2 and the fractional values in variables t1 and t2, the value for the second derivative $I_{11}(\sigma_1,\sigma_2)$ at any arbitrary point $(\sigma_1,\sigma_2)$ is estimated according to Equation 32. The values of the other derivatives $I_{12}(\sigma_1,\sigma_2)$ and $I_{22}(\sigma_1,\sigma_2)$ at any arbitrary point can be found using this interpolation algorithm.

Having determined the solution of the partial differential equations E-x along the line y=0, those solutions can be used as the initial conditions for solving the partial differential equations E-y for $-NDIM+1 \leq y \leq NDIM-1$. It is contemplated that the integration solution can also be performed first by solving E-y along x=0 and using those solutions to solve for E-x. Proceeding next to step 316, a dummy variable j used to count from 1 to NDIM−1 is initialized to the value 1. Proceeding next to step 318, a smoothing or averaging operation is performed on the solution obtained at prior y values. Thus, to solve for the partial differential equations E-y at y=1,−1, the solution obtained for y=0 is first smoothed. Similarly, before solving E-y for y=2,−2, the solutions at y=1,−1 are smoothed. The process is repeated for all other values of y. The smoothing operation is performed to minimize propagation and magnification of errors. The smoothing process used is a standard algorithm well known to those skilled in the art. For a description of this process, refer to Cornelius Lanszos, "Applied Analysis", pp. 316–320 (1956), which is hereby incorporated by reference.

After the solutions of E-y at locations $y=\pm(j-1)$ has been smoothed in step 318, control proceeds to step 320, where the partial differential equations E-y are integrated for $y=\pm j$. The integration is performed using the fourth order Runge-Kutta algorithm similar to that described for solving the partial differential equations E-x. Next, control proceeds to 322, where it is determined if j is less than NDIM. If so, control proceeds to step 324 to increment j by the value 1. From step 324, control returns to step 318, where the smoothing operation is performed. The process repeats until the value of j reaches the value of NDIM, in which case, control proceeds from step 322 to step 326, where the region of validity is determined for the solutions of the partial differential equations E-x and E-y. This is performed by first determining the values of x where the variable $\sigma_1$ approximates the extent of image parameters −SX1 and SX2 on the line y=0. Next, the values of y are obtained where the variable $\sigma_2$ approximates the extent of image parameters −SY1 and SY2 on the line x=0. These values of x and y determine the region of validity, which is represented by an array P of dimension (NDIM*2)−1 by (NDIM*2)−1. The array P is set equal to the value 1 inside the region of validity and set to the value 0 elsewhere.

Proceeding next to step 328, the first and second partial derivatives of the tip function T(x,y) are determined using the computed values for $\sigma_1(x,y)$, $\sigma_2(x,y)$ and T(x,y).

$$T_1(x,y,v) \equiv \frac{\delta T}{\delta x} = -\frac{X}{\sqrt{R^2 - X^2 - Y^2}}, \tag{33}$$

$$T_2(x,y,v) \equiv \frac{\delta T}{\delta x} = -\frac{Y}{\sqrt{R^2 - X^2 - Y^2}}, \tag{34}$$

$$T_{11}(x,y,v) \equiv \frac{\delta^2 T}{\delta x^2} = \frac{Y^2 - R^2}{\sqrt{R^2 - X^2 - Y^2}} \left( \frac{\delta \sigma_1}{\delta x} + 1 \right) -$$
$$\frac{XY}{\sqrt{R^2 - X^2 - Y^2}} \frac{\delta \sigma_1}{\delta x}, \tag{35}$$

$$T_{22}(x,y,v) \equiv \frac{\delta^2 T}{\delta y^2} = \frac{-XY}{\sqrt{R^2 - X^2 - Y^2}} \frac{\delta \sigma_1}{\delta y} + \tag{36}$$
$$\frac{X^2 - R^2}{\sqrt{R^2 - X^2 - Y^2}} \left( \frac{\delta \sigma_2}{\delta y} + 1 \right), \text{ and}$$

$$T_{12}(x,y,v) \equiv \frac{\delta^2 T}{\delta x \delta y} = \frac{Y^2 - R^2}{\sqrt{R^2 - X^2 - Y^2}} \frac{\delta \sigma_1}{\delta y} - \tag{37}$$
$$\frac{XY}{\sqrt{R^2 - x^2 - Y^2}} \left( \frac{\delta \sigma_2}{\delta y} + 1 \right),$$

where R is the radius of the gold ball 100, $X = x + \sigma_1$, and $Y = x + \sigma_2$.

The arrays T(x,y), $T_1(x,y,v)$, $T_2(x,y,v)$, $T_{11}(x,y,v)$, $T_{12}(x,y,v)$, $T_{22}(x,y,v)$, and P(x,y), all having dimensions (NDIM*2)−1 by (NDIM*2)−1, are the tip reconstruction arrays which are utilized to accurately determine the shape of a target sample by removing the effects of the probe 102. The arrays represent, respectively, the tip function T(x,y), the first derivative of the tip function with respect to the variable x, the first derivative of the tip function with respect to the variable y, the second derivative of the tip function with respect to the variable x, the mixed second derivative of the tip function with respect to the variables x and y, the second derivative of the tip function with respect to the variable y, and the region of validity. Thus the accurate shape of the probe 102 has been determined, particularly including any asymmetries or contaminants. This allows much more accurate image reconstruction.

Figure 6A:
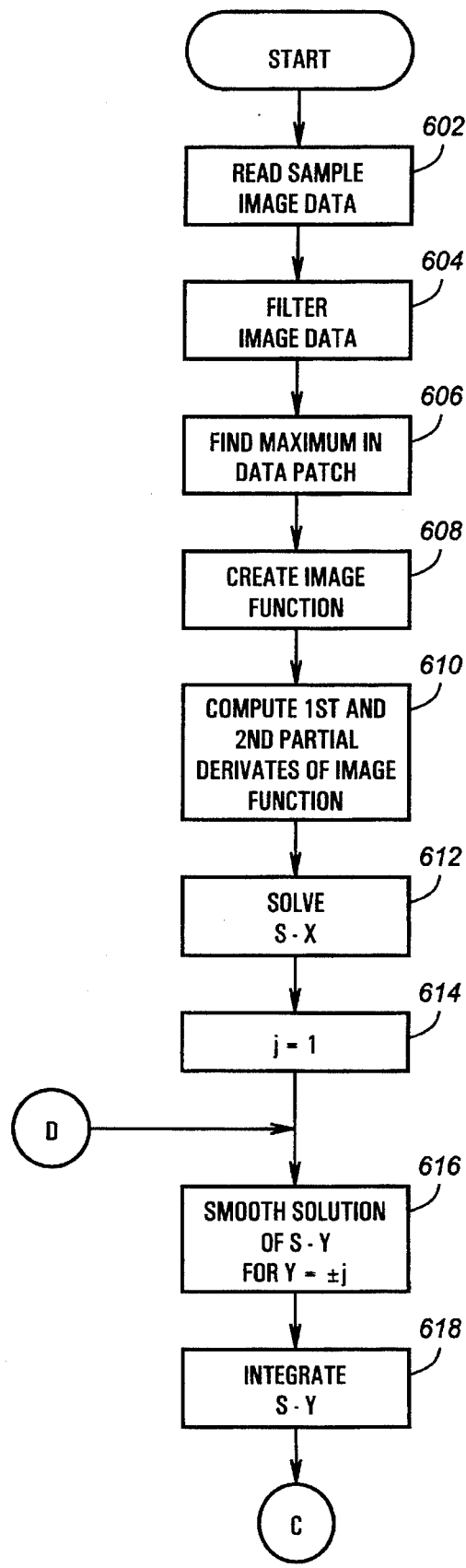
FIGS. 6A and 6B are a flow diagram showing the steps of removing the contributions of the known probe shape from the image of a target sample.
Figure 6B:
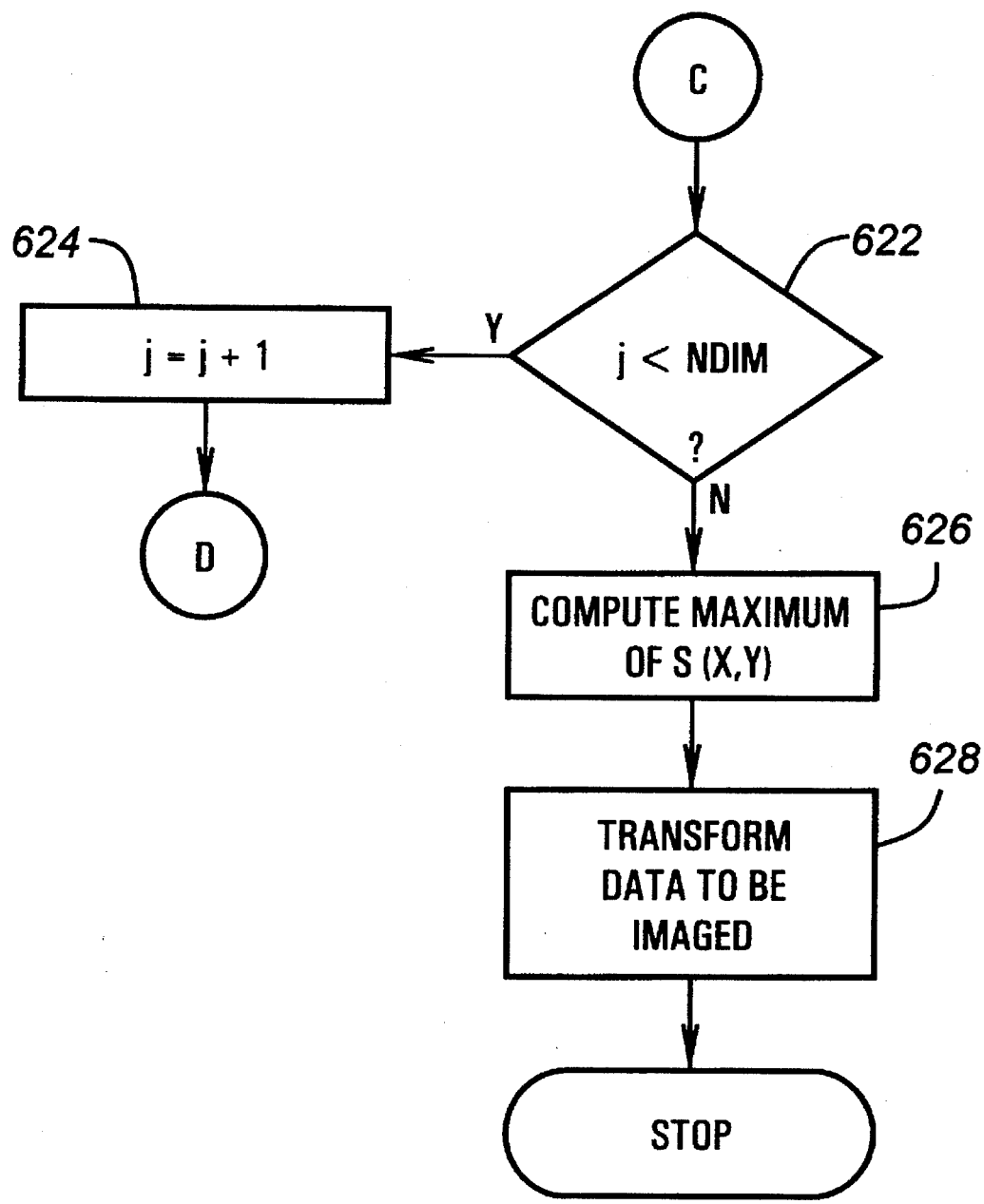

Referring now to FIGS. 6A and 6B, a flow diagram is shown to accurately image a sample by removing the effect of the probe 102 now that the probe 102 shape is accurately known. Starting at step 602, a target sample is imaged with the probe 102 and the imaged data are stored by the computer 114 in an array SD having dimensions IC by IC. Proceeding next to step 604, the imaged data array SD is filtered or averaged according to an algorithm similar to Equation 4. The results are stored in an array SA(i,j) for $1 \leq i,j \leq IC$. Next, in step 606, a search is performed to find the maximum value of the array SA(i,j) inside a data patch. The dimensions of the data patch are entered interactively by a user after he or she has viewed the image of the target sample. From the image, it can be estimated in which local region a maximum will occur. The maximum value is represented by SDMAX, which is the maximum value of SA(i,j), with SIMAX and SJMAX the i and j values of the maximum SA(i,j) value. Next, in step 608, the location (SIMAX, SJMAX) in the averaged data array SA(i,j) is defined as the center for an image function SI(m,n), where $-(JK-1)/2 \leq m,n \leq (JK-1)/2$. The data values in the image function SI(m,n) are scaled according to the following equation:

$$SI(m,n) = \frac{SA(m + SIMAX, n + SJMAX) * SH}{SDMAX}, \tag{38}$$

for $-(JK-1)/2 \leq m,n \leq (JK-1)/2$ and SH is the height in nanometers of the maximum value.

In the ensuing description, the value for H is again assumed to be 1 nm/pixel for the sake of clarity. This allows the variables m and n to be equated to the variables $\sigma_1$ and $\sigma_2$, respectively. Proceeding next to step 610, the second partial derivatives of $SI(\sigma_1,\sigma_2)$, $$\frac{\delta^2 SI(\sigma_1,\sigma_2)}{\delta \sigma_1^2} \equiv SI_{11}(\sigma_1,\sigma_2), \tag{39}$$

$$\frac{\delta^2 SI(\sigma_1,\sigma_2)}{\delta \sigma_2^2} \equiv SI_{22}(\sigma_1,\sigma_2), \tag{40}$$

$$\frac{\delta^2 SI(\sigma_1,\sigma_2)}{\delta \sigma_1 \delta \sigma_2} \equiv SI_{12}(\sigma_1,\sigma_2), \tag{41}$$

are determined. The second partial derivatives of $SI(\sigma_1,\sigma_2)$ are used to calculate the partial differential equations S-X and S-Y to solve for the sample function S(X,Y) and variables $\sigma_1(X,Y)$ and $\sigma_2(X,Y)$ as functions of X and Y. The variables S(X,Y), $\sigma_1(X,Y)$ and $\sigma_2(X,Y)$ are stored in a vector w.

$$w = \begin{pmatrix} S \\ \sigma_1 \\ \sigma_2 \end{pmatrix} \tag{42}$$

The partial differential equations S-X and S-Y are shown in Equations 43 and 44.

$$S-X \begin{cases} \frac{\delta S}{\delta X} = T_1(x,y) \\ \frac{\delta \sigma_1}{\delta X} = [(SI_{22}(\sigma_1,\sigma_2) + T_{22}(x,y))T_{11}(x,y) - \\ \qquad (SI_{12}(\sigma_1,\sigma_2) + T_{12}(x,y))T_{12}(x,y)]/D \\ \frac{\delta \sigma_2}{\delta X} = [-(SI_{12}(\sigma_1,\sigma_2) + T_{12}(x,y))T_{11}(x,y) + \\ \qquad (I_{11}(\sigma_1,\sigma_2) + T_{11}(x,y))T_{12}(x,y)]/D \end{cases} \tag{43}$$

where $x = X - \sigma_1$, $Y = Y - \sigma_2$, and $$D = [I_{11}(\sigma_1,\sigma_2) + T_{11}(x,y)] *$$
$$[I_{22}(\sigma_1,\sigma_2) + T_{22}(x,y)] -$$
$$[I_{12}(\sigma_1,\sigma_2) + T_{12}(x,y)]^2.$$

$$S-Y \begin{cases} \frac{\delta S}{\delta Y} = T_2(x,y) \\ \frac{\delta \sigma_1}{\delta Y} = [(SI_{22}(\sigma 1,\sigma 2) + T_{22}(x,y))T_{12}(x,y) - \\ \qquad (SI_{12}(\sigma_1,\sigma_2) + T_{12}(x,y))T_{22}(x,y)]/D \\ \frac{\delta \sigma_2}{\delta Y} = [-(SI_{12}(\sigma_1,\sigma_2) + T_{12}(x,y))T_{12}(x,y) + \\ \qquad (I_{11}(\sigma_1,\sigma_2) + T_{11}(x,y))T_{22}(x,y)]/D \end{cases} \tag{44}$$

where x,y and D are the same as above. The RHS of the differential equations S-X and S-Y are expressed in terms of derivatives of the known image function $SI(\sigma_1,\sigma_2)$ and of the tip reconstruction arrays $T_1(x,y)$, $T_2(x,y)$, $T_{11}(x,y)$, $T_{12}(x,y)$, and $T_{22}(x,y)$. By including the tip reconstruction arrays in the differential equations S-X and S-Y, the effects of the probe 102 upon the scanned image are automatically removed when the equations S-X and S-Y are solved. Proceeding next to step 612, the partial differential equations S-X are solved for Y=0 and $-NDIM+1 \leq X \leq NDIM-1$. The detailed flow diagram for solving S-X is shown in FIG. 7.

Figure 7:
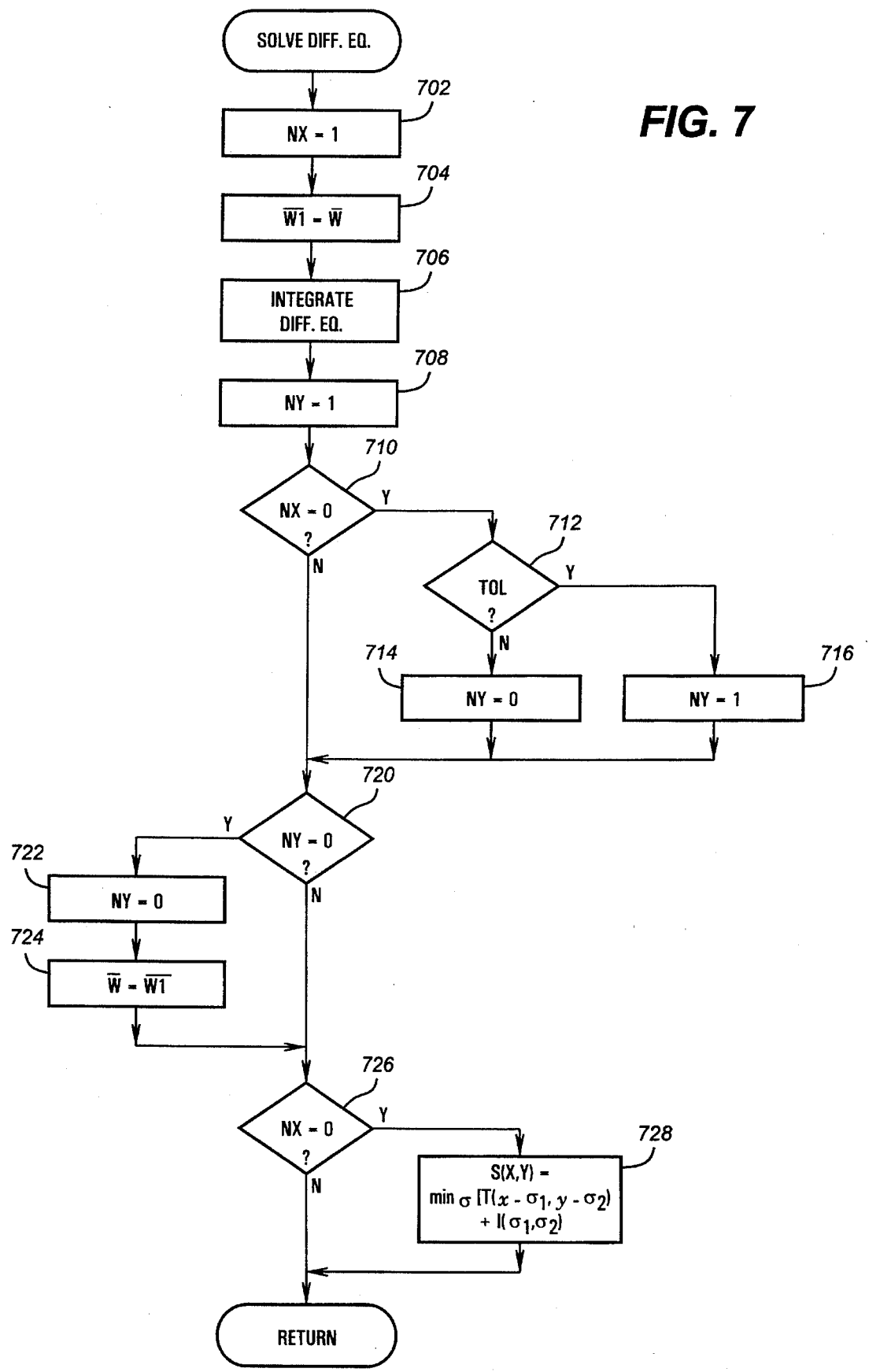
FIG. 7 is a flow diagram showing the steps of solving a differential equation.

Proceeding now to step 702 in FIG. 7, a flag NX is set to the value 1. Next, in step 704, a temporary storage vector wl is set equal to the vector w defined in Equation 38. Next, in step 706, the partial differential equations S-X are integrated according to the fourth order Runge-Kutta algorithm, described earlier with respect to FIG. 3A. In this case, the step h is set to the value 0.5 when integrating forward and −0.5 when integrating backward. If it is determined during the integration step that x or y is less than or equal to −(NDIM−1) or x or y is greater than or equal to NDIM−1, then the flag NX is set to zero. This indicates that the value for T(x,y) is an edge value. Also, if it is determined that the values of x and y would cause the tip function T(x,y) to be outside the region of validity as represented by the array P, then the flag NX is also set to zero. In addition, if $\sigma_1$ or $\sigma_2$ is less than or equal to −(JK−1)/2 or $\sigma_1$ or $\sigma_2$ greater than or equal to (JK−1)/2, then the flag NX is set to zero to indicate that the value for SI($\sigma_1,\sigma_2$) is an edge value. Proceeding next to step 708, another flag NY is initialized to the value 1. Next, in step 710, it is determined if the flag NX is equal to 1. If not, control proceeds to step 720. If so, control proceeds to step 712, where it is determined if $$[SI_1 - T_1]^2 + [SI_2 - T_2]^2 < tol, \quad (45)$$

where tol is a tolerance variable preferably set to the value 0.08, $SI_1$ is the first partial derivative of SI($\sigma_1,\sigma_2$) with respect to $\sigma_1$, $SI_2$ is the first partial derivative of SI($\sigma_1,\sigma_2$) with respect to $\sigma_2$, $T_1$ is the first partial derivative of T(x,y) with respect to x, and $T_2$ is the first partial derivative of T(x,y) with respect to y. Any reasonable tolerance condition can be used. For example, Equation 45 can be modified such that the absolute values of the differences are summed instead of their squared values.

Normally, the values of $T_1$ and $SI_1$ are equal and the values of $T_2$ and $SI_2$ are equal. However, the solutions become inaccurate when edge values are used of derivatives of the image function SI($\sigma_1,\sigma_2$) or tip function T(x,y) or when the derivatives of the image function SI($\sigma_1,\sigma_2$) are needed in a transition region in which the type of sample is changing. If Equation 45 indicates that the tolerance condition has not been met, control proceeds to step 714, where the flag NY is set to zero. Also, if an error condition causes one of the derivatives $SI_1$, $SI_2$, $T_1$ or $T_2$ to be out of range, then control also proceeds to step 714. Otherwise, control proceeds to step 716, where the flag NY is maintained at the value 1. From either step 714 or 716, control proceeds to step 720, where it is determined if the flag NY is set to the value zero. If not, control proceeds to step 726. If so, control proceeds to step 722, where the flag NX is set to zero. Next, in step 724, the vector w is restored to its original value as stored in the temporary storage vector w1, which contains the original values of the variables S(X,Y), $\sigma_1$(X,Y) and $\sigma_2$(X,Y) before the Runge-Kutta integration was performed in step 706. From step 724, control proceeds to step 726, where it is determined if the flag NX is set to zero, which indicates that an edge value for one of the derivatives of either SI($\sigma_1,\sigma_2$) or T(x,y) is being used, the solution is obtained in a transition region in which the type of sample is changing, or an error condition has occurred. If the flag NX is not equal to zero, control returns to the main program in FIG. 6A. If NX is set to zero, then control proceeds to step 728, where the sample function S(X,Y) and variables $\sigma_1$(X,Y) and $\sigma_2$(X,Y) are corrected. The correction is done by performing a local minimization according to the following equation:

$$S(X,Y) = \min_\sigma [T(X-\sigma_1, Y-\sigma_2) + I(\sigma_1,\sigma_2)] \quad (46)$$

where the minimum is determined inside a square region centered at $(\sigma_{10},\sigma_{20})$ for $-3 \leq \sigma_1,\sigma_2 \leq 4$. If the flag Ny is determined to be zero in step 720, then the values of $\sigma_{10}$ and $\sigma_{20}$ are set to the values of $\sigma_1$ and $\sigma_2$ stored in w1. Otherwise, $\sigma_{10}$ and $\sigma_{20}$ are set to the values of $\sigma_1$ and $\sigma_2$ found in the integration step 706. Once the minimum value is found, the values of $\sigma_1$(X,Y) and $\sigma_2$(X,Y) are changed to the location of the minimum. From step 728, control returns to the main program in FIG. 6A.

Returning now to FIG. 6A, control proceeds from step 612 to step 614, where a dummy variable j, which counts from the value 1 to the value NDIM−1, is initialized to a 1. Proceeding next to step 618, the solutions of the partial differential equations S-Y at Y=±(j−1) are smoothed or averaged. Next, in step 618, the partial differential equations S-Y at Y=±j are solved according to the process shown in FIG. 7. The integration steps 616 and 618 for the partial differential equations S-Y are similar to the integration steps 318 and 320 for the partial differential equations E-Y in FIG. 3A, except that the Runge-Kutta integration step h is equal to ±0.5 in step 618. Proceeding next to step 620, it is determined if j is less than NDIM. If so, control proceeds to step 622, where the dummy variable j is incremented by 1. Control then returns to step 616. If in step 620, it is determined that the dummy variable j is greater than or equal to NDIM, then control proceeds to step 624. In step 624, the maximum value of the sample function S(X,Y) for −NDIM+1 ≤ X,Y ≤ NDIM−1 is determined. Next, in step 626, the corrected and reconstructed sample image S(X,Y) is transformed to a format that can be viewed by graphic software known to those skilled in the art.

Due to the incompressible nature of the colloidal gold balls, it is also possible to co-adsorb the colloidal gold balls with the target sample molecules. In this manner, the tip reconstruction process and the process of deconvolving the contributions of the probe can be performed in one scan cycle. This allows a much more efficient means of imaging desired specimens. In addition, by co-adsorbing the colloidal gold balls with the sample molecules, the probe can be reconstructed each time the sample is imaged. Thus, any change in probe shape would be found, which would allow for more accurate imaging.

Thus a method of reconstructing the shape of an atomic force microscope has been described. The shape of the probe, which is represented by a tip function, is derived from an image taken of a colloidal gold ball by the atomic force microscope. Since the size and shape of the colloidal gold ball is known, the probe shape can readily be determined. After the probe shape has been determined, it is possible to deconvolve or enhance the image of a target sample. This is done by removing the effect of the probe from the target sample image. Further, it is also possible to co-adsorb the colloidal gold balls with the target sample molecules to allow the simultaneous determination of the probe shape and the sample molecule shape.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A method of reconstructing the shape of an atomic force microscope probe using an atomic particle of known shape and size, wherein the probe is attached to a cantilever, and wherein the cantilever is deflected by the atomic particle, the method comprising the steps of:

scanning the probe over the atomic particle;

translating the resulting deflections into signals representative of the shape of the atomic particle;

receiving said signals representative of the shape of the atomic particle;

transforming said received signals into data points; and determining the probe shape from said data points by using relationships of the probe shape to the known size and shape of the atomic particle.

2. The method of claim 1, wherein the atomic particle is generally spherical in shape and has a radius that is determinable from said data points.

3. The method of claim 2, wherein the atomic particle is a colloidal gold ball.

4. The method of claim 2, further comprising the step of:

determining said radius of the atomic particle before said step of determining the probe shape.

5. The method of claim 2, wherein the probe is generally parabolic in shape, and wherein the probe makes tangential contact with the atomic particle.

6. The method of claim 1, wherein said step of determining the probe shape includes the steps of:

converting said data points into an image function I, wherein said image function I is dependent upon scan coordinates $\sigma_1$ and $\sigma_2$, the probe shape is represented by a tip function T, said tip function T is dependent upon tip coordinates x and y, and said scan coordinates $\sigma_1$ and $\sigma_2$ are related to said tip coordinates x and y;

determining values of first and second partial derivatives of said image function I with respect to said scan coordinates $\sigma_1$ and $\sigma_2$;

deriving first partial derivatives of said tip function T with respect to said tip coordinates x and y, wherein said first partial derivatives of said tip function T are expressed in terms of said scan coordinates $\sigma_1$ and $\sigma_2$ and said tip coordinates x and Y;

deriving first partial derivatives of said scan coordinates $\sigma_1$ and $\sigma_2$ with respect to said tip coordinates x and y, wherein said first partial derivatives of said scan coordinates $\sigma_1$ and $\sigma_2$ are expressed in terms of said first and second partial derivatives of said image function I, and wherein a first group and a second group of partial differential equations of said tip function and said scan coordinates $\sigma_1$ and $\sigma_2$ are formulated, said first group of partial differential equations of said tip function and said scan coordinates $\sigma_1$ and $\sigma_2$ being taken with respect to said tip coordinate x, said second group of partial differential equations of said tip function and said scan coordinates $\sigma_1$ and $\sigma_2$ being taken with respect to said tip coordinate y; and solving said partial differential equations to determine said tip function T.

7. The method of claim 6, further comprising the step of:

determining a region in which said tip function T is valid.

8. The method of claim 6, wherein said step of solving said partial differential equations includes the steps of:

integrating said first group of partial differential equations of said tip function and said scan coordinates $\sigma_1$ and $\sigma_2$ along said tip coordinate x; and integrating said second group of partial differential equations of said tip function and said scan coordinates $\sigma_1$ and $\sigma_2$ along said tip coordinate y, wherein solutions obtained in said integrating step along said tip coordinate x are used as initial conditions for said integrating step along said tip coordinate y.

9. The method of claim 8, wherein said step of solving said differential equations further includes the steps of:

smoothing said solutions obtained in said integrating step along said tip coordinate x before using said solutions as said initial conditions for said integrating step along said tip coordinate y.

10. The method of claim 6, wherein said step of solving said partial differential equations includes the steps of:

integrating said second group of partial differential equations of said tip function and said scan coordinates $\sigma_1$ and $\sigma_2$ along said tip coordinate y; and integrating said first group of partial differential equations of said tip function and said scan coordinates $\sigma_1$ and $\sigma_2$ along said tip coordinate x, wherein solutions obtained in said integrating step along said tip coordinate y are used as initial conditions for said integrating step along said tip coordinate x.

11. The method of claim 6, further comprising the step of:

smoothing said image function I to remove noise components of said received signals.

12. The method of claim 6, wherein said step of converting said data points into said image function I includes the steps of:

storing said data points in an array having a first dimension; and scaling said data points to derive said image function I.

13. The method of claim 12, wherein said step of converting said data points into said image function I further includes the step of:

centering said image function I at a maximum in said data point array.

14. The method of claim 13, wherein said step of converting said data points into said image function I further includes the step of:

defining a data window having a second dimension in which said image function I is valid, wherein said second dimension is smaller than said first dimension.

15. A method of accurately imaging a target sample with an atomic force microscope having a probe, wherein the probe is represented by a known tip function T, wherein the probe is attached to a cantilever, and wherein the cantilever is deflected by the target sample, the method comprising the steps of:

scanning the probe over the target sample;

translating the resulting deflections into signals representative of the contour of the target sample;

receiving said signals representative of the contour of the target sample;

transforming said received signals into data points; and deconvolving the tip function T from said data points to obtain an accurate image of the target sample.

16. The method of claim 15, wherein the target sample includes small biomolecules.

17. The method of claim 15, wherein said step of deconvolving the tip function T from said data points includes the steps of:

converting said data points into an image function SI, wherein the target sample is represented by a sample function S, said sample function S is dependent upon sample coordinates X and Y, said image function SI is dependent upon scan coordinates $\sigma_1$ and $\sigma_2$, the tip function T is dependent upon tip coordinates x and y, and said scan coordinates $\sigma_1$ and $\sigma_2$, said tip coordinates x and y, and said sample coordinates X and Y are all related;

determining values of first and second partial derivatives of said image function SI with respect to said scan coordinates $\sigma_1$ and $\sigma_2$;

determining values of first and second partial derivatives of the tip function T with respect to said tip coordinates x and y;

deriving first partial derivatives of the sample function S with respect to said sample coordinates X and Y, wherein said first partial derivatives of the sample function S are expressed in terms of said first partial derivatives of the tip function T;

deriving first partial derivatives of said scan coordinates $\sigma_1$ and $\sigma_2$ with respect to said sample coordinates X and Y, wherein said first partial derivatives of said scan coordinates $\sigma_1$ and $\sigma_2$ are expressed in terms of said first and second partial derivatives of said image function SI and of said first and second partial derivatives of the tip function T, and wherein a first group and a second group of partial differential equations of said sample function S and said scan coordinates $\sigma_1$ and $\sigma_2$ are formulated, said first group of partial differential equations of said sample function S and said scan coordinates $\sigma_1$ and $\sigma_2$ being taken with respect to said sample coordinate X, said second group of partial differential equations of said sample function S and said scan coordinates $\sigma_1$ and $\sigma_2$ being taken with respect to said sample coordinate Y; and solving said partial differential equations of the tip function and said scan coordinates $\sigma_1$ and $\sigma_2$ to determine the sample function S.

18. The method of claim 17, wherein said step of solving said partial differential equations includes the steps of:

integrating said first group of partial differential equations of said sample function S and said scan coordinates $\sigma_1$ and $\sigma_2$ along said sample coordinate X; and integrating said second group of partial differential equations of said sample function S and said scan coordinates $\sigma_1$ and $\sigma_2$ along said sample coordinate Y, wherein solutions obtained in said integrating step along said sample coordinate X are used as initial conditions for said integrating step along said sample coordinate Y.

19. The method of claim 18, wherein said step of solving said partial differential equations further includes the step of:

smoothing said solutions obtained in said integrating step along said sample coordinate X before using said solutions as said initial conditions for said integrating step along said sample coordinate Y.

20. The method of claim 17, wherein said step of solving said partial differential equations includes the steps of:

integrating said second group of partial differential equations of said sample function S and said scan coordinates $\sigma_1$ and $\sigma_2$ along said sample coordinate Y; and integrating said first group of partial differential equations of said sample function S and said scan coordinates $\sigma_1$ and $\sigma_2$ along said sample coordinate X, wherein solutions obtained in said integrating step along said sample coordinate Y are used as initial conditions for said integrating step along said sample coordinate X.

21. The method of claim 18, wherein said step of solving said partial differential equations further includes the steps of:

determining if values of said first and second derivatives of said image function SI or said first and second derivatives of the tip function T being used in said integrating steps are edge values; and correcting said solution of the sample function S if it is determined that edge values are being used.

22. The method of claim 18, wherein said derivatives of the tip function are valid within a region of validity, and wherein said step of solving said partial differential equations further includes the steps of:

determining if values of said first and second derivatives of the tip function T are within said region of validity; and correcting said solution of the sample function S if it is determined that said values of said first and second derivatives of the tip function I are outside said region of validity.

23. The method of claim 18, wherein said step of solving said partial differential equations further includes the steps of:

determining if a tolerance condition is met; and correcting said solution of the sample function S if it is determined that said tolerance condition has not been met.

24. The method of claim 23, wherein said step of determining if said tolerance condition has been met includes the steps of:

squaring the difference between said first partial derivative of said image function SI with respect to said scan coordinate S and said first partial derivative of the tip function T with respect to said tip coordinate x;

squaring the difference between said first partial derivative of said image function SI with respect to said scan coordinate $\sigma_2$ and said first partial derivative of the tip function T with respect to said tip coordinate y;

summing values obtained from said squaring steps; and determining if said sum is less than a predetermined tolerance value, wherein said tolerance condition is met if said sum is less than said predetermined tolerance value.

25. The method of claim 17, further comprising the steps of:

smoothing said image function SI to remove noise components of said received signals.

26. The method of claim 17, wherein said step of converting said data points into said image function SI includes the steps of:

storing said data points in an array having a first dimension; and scaling said data points to derive said image function SI.

27. The method of claim 26, wherein said step of converting said data points into said image function SI further includes the steps of:

centering said image function SI at a maximum in said data point array.

28. The method of claim 27, wherein said step of converting said data points into said image function SI further includes the steps of:

defining a data window having a second dimension in which said image function SI is valid, wherein said second dimension is smaller than said first dimension.

29. A method of accurately imaging a target sample with an atomic force microscope having a probe, wherein the probe is attached to a cantilever, and wherein the cantilever is deflected by the target sample, the method comprising the steps of:

reconstructing the shape of the probe using an atomic particle of known shape and size, wherein the probe shape is represented as a tip function T, said reconstructing step including the steps of:

scanning the probe over said atomic particle, wherein the probe is deflected by said atomic particle;

translating the resulting deflections into signals representative of said shape of said atomic particle;

receiving said signals representative of said shape of said atomic particle;

transforming said received signals into first data points; and determining the probe shape from said first data points by using relationships of the probe shape to said known size and shape of said atomic particle;

scanning the probe over the target sample;

translating the resulting deflections into signals representative of the contour of the target sample;

receiving said signals representative of the contour of the target sample;

transforming said received signals into second data points; and deconvolving said tip function T from said second data points to obtain an accurate image of the sample target.

30. The method of claim 29, wherein said step of determining the probe shape includes the steps of:

converting said first data points into an image function I, wherein said image function I is dependent upon scan coordinates $\sigma_1$ and $\sigma_2$, the probe shape is represented by a tip function T, said tip function T is dependent upon tip coordinates x and y, and said scan coordinates $\sigma_1$ and $\sigma_2$ are related to said tip coordinates x and y;

determining values of first and second partial derivatives of said image function I with respect to said scan coordinates $\sigma_1$ and $\sigma_2$;

deriving first partial derivatives of said tip function T with respect to said tip coordinates x and y, wherein said first partial derivatives of said tip function T are expressed in terms of said scan coordinates $\sigma_1$ and $\sigma_2$ and said tip coordinates x and y;

deriving first partial derivatives of said scan coordinates $\sigma_1$ and $\sigma_2$ with respect to said tip coordinates x and y, wherein said first partial derivatives of said scan coordinates $\sigma_1$ and $\sigma_2$ are expressed in terms of said first and second partial derivatives of said image function I, and wherein a first group and a second group of partial differential equations of said tip function and said scan coordinates $\sigma_1$ and $\sigma_2$ are formulated, said first group of partial differential equations of said tip function and said scan coordinates $\sigma_1$ and $\sigma_2$ being taken with respect to said tip coordinate x, said second group of partial differential equations of said tip function and said scan coordinates $\sigma_1$ and $\sigma_2$ being taken with respect to said tip coordinate y; and solving said partial differential equations to determine said tip function T; and wherein said step of deconvolving said tip function T from said second data points includes the steps of:

converting said second data points into an image function SI, wherein the target sample is represented by a sample function S, said sample function S is dependent upon sample coordinates X and Y, said image function SI is dependent upon said scan coordinates $\sigma_1$ and $\sigma_2$, said tip function T is dependent upon said tip coordinates x and y, and said scan coordinates $\sigma_1$ and $\sigma_2$, said tip coordinates x and y, and said sample coordinates X and Y are all related;

determining values of first and second partial derivatives of said image function SI with respect to said scan coordinates $\sigma_1$ and $\sigma_2$;

determining values of first and second partial derivatives of said tip function T with respect to said tip coordinates x and y;

deriving first partial derivatives of the sample function S with respect to said sample coordinates X and Y, wherein said first partial derivatives of the sample function S are expressed in terms of said first partial derivatives of said tip function T;

deriving first partial derivatives of said scan coordinates $\sigma_1$ and $\sigma_2$ with respect to said sample coordinates X and Y, wherein said first partial derivatives of said scan coordinates $\sigma_1$ and $\sigma_2$ are expressed in terms of said first and second partial derivatives of said image function SI and of said first and second partial derivatives of said tip function T, and wherein a first group and a second group of partial differential equations of said sample function S and said scan coordinates $\sigma_1$ and $\sigma_2$ are formulated, said first group of partial differential equations of said sample function S and said scan coordinates $\sigma_1$ and $\sigma_2$ being taken with respect to said sample coordinate X, said second group of partial differential equations of said sample function S and said scan coordinates $\sigma_1$ and $\sigma_2$ being taken with respect to said sample coordinate Y; and solving said partial differential equations to determine the sample function S.

31. The method of claim 29, wherein said atomic particle is generally spherical in shape and has a radius that is determinable from said first data points.

32. The method of claim 31, further comprising the step of:

determining said radius of said atomic particle before said step of determining the probe shape.

33. The method of claim 31, wherein said atomic particle is a colloidal gold ball.

34. The method of claim 31, wherein the probe is generally parabolic in shape, and wherein the probe makes tangential contact with said atomic particle.

35. The method of claim 29, wherein the target sample includes small biomolecules.

36. The method of claim 29, wherein the target sample includes a plurality of sample molecules being co-adsorbed with a plurality of said atomic particles having known size and shape, wherein said step of scanning the target sample includes scanning said plurality of sample molecules and said plurality of co-adsorbed atomic particles, and wherein said step of reconstructing the probe shape and deconvolving said tip function T from said image function SI are performed together.

* * * * *